United States Patent [19]

Müller

[11] 3,932,793

[45] Jan. 13, 1976

[54] SPEED CONTROL CIRCUIT FOR PERMANENT MAGNET D-C MOTORS

[75] Inventor: Rolf Müller, St. Georgen, Germany

[73] Assignee: Papst-Motoren KG, St. Georgen, Germany

[22] Filed: Mar. 18, 1974

[21] Appl. No.: 451,869

[30] Foreign Application Priority Data

Mar. 22, 1973 Germany............................ 2314257

[52] U.S. Cl................................. 318/138; 318/254
[51] Int. Cl.².......................................... H02K 29/02
[58] Field of Search........... 318/138, 254, 685, 696, 318/439

[56] References Cited
UNITED STATES PATENTS

| | | | |
|---|---|---|---|
| 3,662,237 | 5/1972 | Favre...................... | 318/254 |
| 3,688,172 | 8/1972 | Seiber et al.............. | 318/254 |
| 3,750,000 | 7/1973 | Bruckner et al.......... | 318/696 |
| 3,757,185 | 9/1973 | Brunner et al........... | 318/254 |
| 3,767,986 | 10/1973 | Wada....................... | 318/138 |
| 3,783,359 | 1/1974 | Malkiel.................... | 318/254 |
| 3,795,849 | 3/1974 | Futagawa et al......... | 318/254 |

FOREIGN PATENTS OR APPLICATIONS 1,213,092   11/1972   United Kingdom................. 318/254

*Primary Examiner*—James R. Scott
*Assistant Examiner*—John W. Redman
*Attorney, Agent, or Firm*—Flynn and Frishauf

[57] ABSTRACT

To obtain in a brushless d-c motor a speed control signal which is dependent both on rotational speed and on armature current in a predetermined mix, each of *n* armature winding has a diode connected thereto with one terminal, all terminals of the diodes being connected together to provide a first control voltage which coupled out from the windings during current flow therethrough and is representative of a composite of the emf induced by the field of the rotor in the *n* armature windings and of resistance voltage drop due to the current flow through the respective armature windings; resistors have one terminal, each, connected to the same *n* respective armature windings and the other terminals together to provide a common resistor junction at which a second control voltage is derived representative of $1/n$ of the resistance voltage drop due to current flow through said *n* armature windings. The two control voltages are normalized or weighted with respect to each other, compared, and the comparison is applied to a speed control circuit which will be responsive to armature current and to induced voltages. Positive or negative feedback can be introduced, in dependence on armature current, by affecting the normalization or weighting ratio.

18 Claims, 11 Drawing Figures

SPEED CONTROL CIRCUIT FOR PERMANENT MAGNET D-C MOTORS

Cross reference to related application:
U.S. Ser. No. 363,290, filed May 23, 1973, now U.S. Pat. No. 3,873,897;
U.S. Ser. No. 363,291, filed May 23, 1973, now U.S. Pat. 3,840,761;
U.S. Ser. No. 402,259, filed Oct. 1, 1973;
U.S. Ser. No. 408,781, filed Oct. 23, 1973;
U.S. Ser. No. 419,416, filed Nov. 27, 1973.

The present invention relates to a speed control circuit for d-c motors, and more particularly to control the speed of a brushless d-c motor having a permanent magnet rotor, in which the armature windings are connected in series or, if multi-phase, in star connection, and in which control voltages are derived from the armature windings to form a comparison value for the speed control.

It has previously been proposed (see "Siemens Journal", 1966, vol. 9, pages 690 to 693) to derive voltages induced in the rotor from armature windings which, at a given time do not have armature current flowing therethrough, by means of diodes. The output voltage derived from the diodes is a wavy, undulating d-c voltage, having an amplitude which is roughly proportional to speed, and independent of the value of the armature current. It has also been proposed to control speed by adding a signal representative of armature current to the counter electromotive force (emf) derived from the armature of the motor (see U.S. Pat. No. 2,236,086, particularly FIG. 3, with respect to a customary collector d-c motor). It is difficult to apply the concept described in U.S. Pat. No. 2,236,086 to a brushless d-c motor without additional circuit components which, in many instances, is undesired. If the armature current is to be considered for control, measuring resistors have to be included in the armature circuit as described in U.S. Pat. No. 3,231,808. This causes additional losses and, even if these measuring resistors are cold conductors (positive temperature coefficient conductors), it is difficult to provide an output signal which is truly representative of armature resistance, since the armature winding changes its temperature, in operation, in accordance with different characteristics than the measuring resistor. It is, then, necessary to hold amplification in the control loop to such a low level that the controller will operate stably even under worst conditions. Upon high loading, the speed control becomes unsatisfactory since the speed will drop, so that the capability of the controller to provide a constant, or level output speed of the motor, is impaired.

It is an object of the present invention to provide a speed control circuit which is simple and has excellent control characteristics.

SUBJECT MATTER OF THE PRESENT INVENTION

Briefly, a first control voltage is derived by means of diodes, sensing voltage half-waves from at least a portion of the armature windings to obtain control voltages representative of the induced emf due to rotation of a permanent magnet rotor during current flow through the windings, as well as of the ohmic voltage drop arising in the respective armature winding due to such current flow. One diode, each, is connected to the armature windings which are connected in series, or in star connection. The second control voltage is derived by means of likewise series, or star connected ohmic resistors, connected to the same armature windings as the diodes. When using $n$ armature windings, the resistors will provide output voltages which are representative of $1/n$ of the voltage drop due to current flow in the armature windings. By means of a normalizing or weighting network (reducing the first control voltage, or amplifying the second control voltage, by a factor of $n$, respectively) and deriving a difference between weighted, normalized voltages, then permits control of a speed controller, as known, to command energization of the armature windings. The armature windings, themselves, are used sequentially as the measuring resistors in order to determine the armature current flowing therein, so that the armature current is accurately measured. Amplification within the control loop thus need not consider non-linearities in measuring elements, or analog elements which are to simulate armature current.

The armature current signal, as sensed, can be applied with feedback in negative, or positive direction, as desired. This is particularly advantageous when building a control circuit, and considering the values of the components thereof. Positive feedback permits high loop amplification with a minimum number of components. Intermittent on-off control may be obtained, thereby, if the motor is suitable for this type of operation. On-off control results in a torque characteristic which is somewhat non-uniform; such operation may not be suitable for all applications, for example may not be desirable for audio drives.

Negative feedback can be used in order to provide linearity in the control loop. Many brushless d-c motors use control elements and circuit components which are more or less non-linear, such as transistors, diodes, or Hall generators. The non-linear characteristics of these elements prevent high uniform amplification over a wide control range.

The invention will be described by way of example with reference to the accompanying drawings, wherein.

Figure 1:
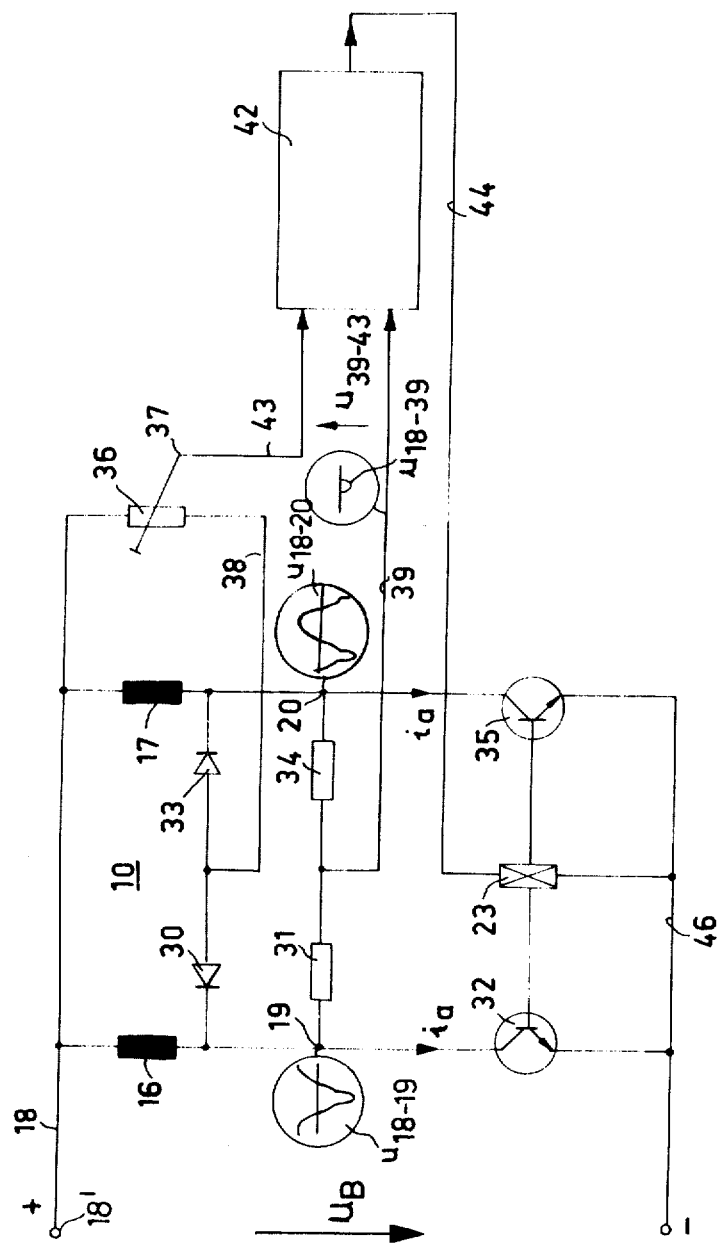
FIG. 1 is a highly schematic block diagram of a control circuit, showing the motor winding schematically, for use with a single-phase brushless permanent magnet d-c motor arranged to provide for auxiliary reluctance torque.

The circuit of FIG. 1 is used to control the speed of a single-phase brushless d-c motor, in which a reluctance torque is provided, during operation. With respect to the motor construction, and a basic speed control circuit, reference is made to application Ser. Nos. 363,290 363,291, now U.S. Pat. Nos. 3,873,897 and 3,840,761 both filed May 23, 1973, assigned to the assignee of the present application. The motor of FIG. 2 which is shown as a nonlimitative example is illustrated as an external rotor motor 10, having an external permanent magnet rotor 11, which is radially polarized. As illustrated, it is formed with two poles rotating, in operation, in the direction of arrow 12.

The stator 13 of motor 10 is a double T-armature having an upper role 14 and a lower pole 15. Both are mushroom-shaped and span almost the entire arc of the respective pole. Stator 13 is wound with two serially connected windings 16, 17, having a center tap, connected to a terminal 18. The free terminals of the windings are shown at 19, 20. A Hall generator 23 is located at the opening of the right-side slot 24 formed in the stator for windings 16 and 17.

The air gap 25 above pole 14 and the air gap 26 above pole 15 are non-uniform. Looked at in the direction of rotation of the motor, the air gap decreases over a first angle $\alpha$ and then increased over a second angle $\beta$. The rotor 11, therefore, has the tendency to align in accordance with the chain-dotted lines L, in which its two poles are opposite the smallest, or shortest air gap. If the rotor is rotated out of this position by electromagnetic force (connection of winding 16, or winding 17 to a source of current), then magnetic energy is stored in the magnetic system of the motor 10. Upon disconnection of the electromagnetic force, the stored energy provides a reluctance torque which drives the rotor until it has again reached the chain-dotted line L, which may be referred to as a 2 o'clock or 8 o'clock position. It is immaterial if the Northpole N of rotor 11 is at the 2 o'clock or 8 o'clock position, since both positions are stable, equilibrium positions of the rotor 11.

The angles $\alpha$, $\beta$ and $\gamma$, as well as the rate of decrease and increase of air gap, are preferably so selected that the overall resulting torque, in operation of the motor, is effectively constant or even. Preferably, the rotor 11 has a generally trapezoidal magnetization.

Figure 2:
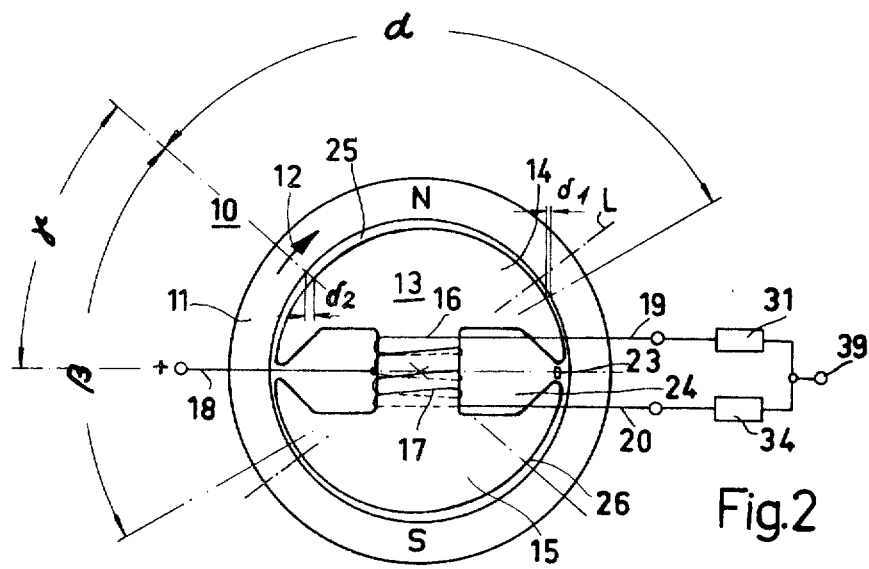
FIG. 2 is a schematic cross-sectional view of a motor constructed to provide for reluctance torque.

The reluctance auxiliary torque is proportional to change in magnetic energy with respect to the angle of rotation. The magnetic energy is roughly proportional to the length of the air gap. Broadly speaking, upon increase of the air gap under the rotor poles in the direction of rotation, a braking torque is applied, resulting in a net decrease in drive torque. The extent of the reluctance auxiliary torque can be controlled in wide limits, and matched to requirements, by selection of an appropriate difference between $\delta_2$, the maximum air gap and $\delta_1$, the minimum air gap (FIG. 2).

Motors of this type, operating with a reluctance auxiliary torque, can be controlled by a speed control circuit as illustrated in FIG. 1. The speed control circuit is independent of the type of motor with which it is to be used and, as illustrated and discussed below with respect to FIG. 8, the same principle may be used for motors with more than two windings, with motors which do not use an auxiliary reluctance torque, that is, with motors which are driven solely by electromagnetically derived torques, and motors which are of the permanent magnet rotor type, as well as those which are extraneously energized, for example over slip rings. The system is, however, preferably used with permanent magnet rotors, since all moving contacts are thereby avoided.

Referring now to FIG. 1: The two windings 16, 17 of motor 10 are schematically shown, having their central tap connection 18 connected to the positive terminal of a d-c source, for example 24 V. Terminal 19 of winding 16 is connected to the cathode of a diode 30, to one terminal of a resistor 31, and to the collector of the collector-emitter path of an npn transistor 32, forming a control switch for the winding 16. Similarly, terminal 20 of winding 17 is connected to the cathode of a diode 33, one terminal of a resistor 34, and to the collector of a transistor 35. The anodes of diodes 30, 33 are connected together to a junction 38, shown as a connecting line, and connected to one terminal of a potentiometer resistor 36. The slider or tap 37 of the potentiometer 36 is set approximately in the center of the potentiometer resistance, so that the potentiometer 36 is sub-divided into approximately equal resistance portions. Slight shift of the tap or slider 37 in the one or the other direction from exact center changes the operation of the circuit by providing either positive or negative feedback, as will be described in detail below. The other terminal of the potentiometer resistor 36 is connected to the positive connection and to center tap terminal 18 of the windings.

The second terminals of resistors 31, 34 are connected to a common resistor junction 39, shown as a control line which is connected to one input terminal of a speed controller 42. The other terminal of the speed controller 42 is connected over line 43 with the slider 37 of potentiometer 36.

The output of speed controller 42 is connected over line 44 with the control input of Hall generator 23 (see FIG. 2), the other terminal of which is connected to a common negative bus 46, to which also the emitters of transistors 32, 35 are connected. The bases of the transistors 32, 35 are connected to the two control terminals of the Hall generator 23.

Upon rotation of the rotor 11 (FIG. 2), voltages are induced in the windings 16, 17, which are in opposite phase with respect to each other and, depending on the form or shape of the magnetic circuit, may be sinusoidal. Let it be assumed that rotor 11 (FIG. 2) is driven; junction or terminal 19 will become positive with respect to terminal 18 when the terminal 20 becomes negative with respect to terminal 18, and vice versa. Due to symmetry, the changes in voltages will be symmetrical. If the two resistors 31, 34 are of equal value then, as can be seen from FIG. 2 due to the symmetrical arrangement, and upon driving the rotor 11, terminals 18 and junction 39 must have the same voltage; in other words, the terminal 39 is an artificial, or imaginary, or phantom null or zero of the system.

If the arrangement operates as a motor, the voltage of junction 39 differs with respect to that of the voltage at the terminal 18, and the positive terminal 18' of the system, if one of the transistors 32 or 35 is connected, so that current will flow through the associated winding 16, or 17.

Figure 3:
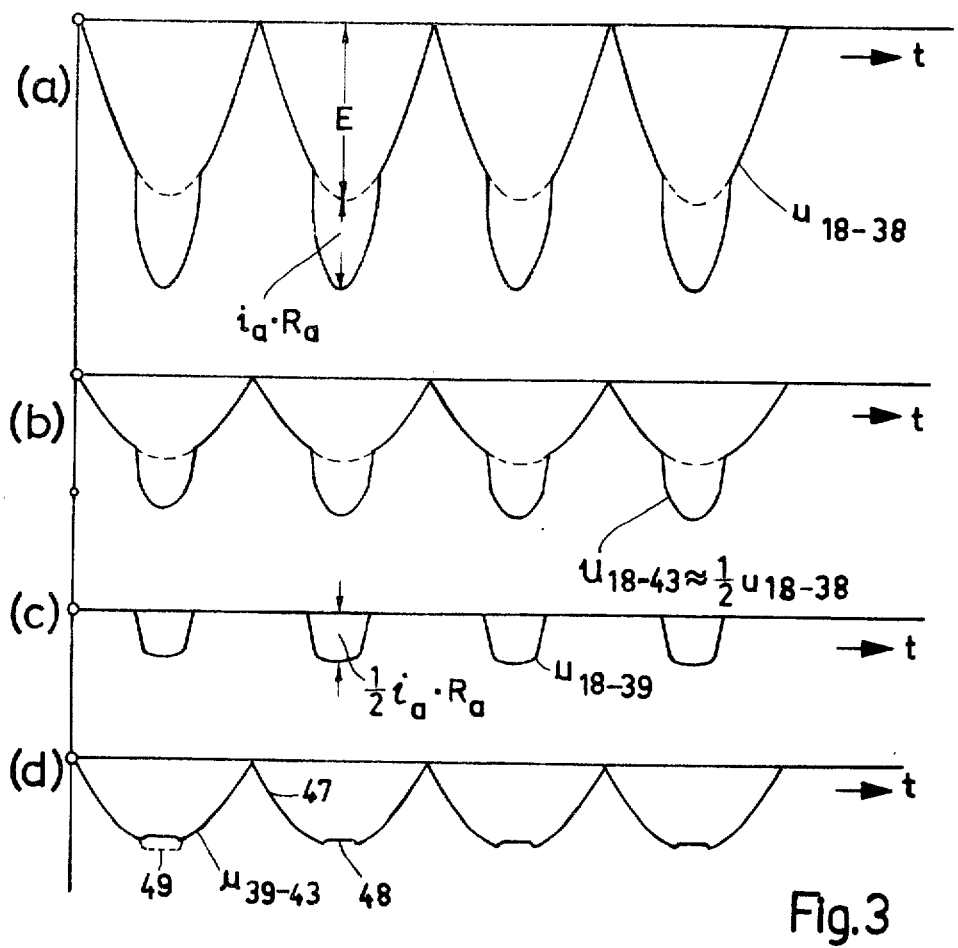
FIG. 3 is a series of graphs illustrating voltage relationships of signals arising in the circuit of FIG. 1.

Operation, with reference to FIG. 3: Graph a in the upper row of FIG. 3 shows the voltages which arise in the windings which carry current. The voltage indicated by $E$ is the emf-induced voltage due to rotation of rotor 11 in any one of the windings. The voltage $i_a \cdot R_a$ is the voltage drop which is caused by flow of current $i_a$ through the winding having a resistance $R_a$. If the motor runs slowly, $E$ may, for example, be 5 V and the $iR$ drop may, for example, be 20 V approximately.

Voltage drop $i_a \cdot R_a$ thus causes junction 39 to have a negative voltage $u_{39}$, with respect to line 18. The voltage distribution, in time, at the junction 39 is proportional to $i_a \cdot R_a$, but has only half the value due to the presence of the two parallel connected resistors 31, 34, that is, has an absolute value of $0.5 \cdot i_a \cdot R_a$. This voltage is seen in graph $c$ of FIG. 3.

Curves for the voltages $u_{18-19}$ and $u_{18-20}$, as well as the voltage $u_{18-39}$ are also illustrated in FIG. 1. The voltage notation is conventional — the subscript denoting the terminals or junctions across which the voltages are taken. The voltages at terminals 19 and 20 are symmetrical (except due to the $iR$ drop resulting from armature current) so that line 39 will have a signal thereat which is proportional to the voltage drop across the respective current-carrying winding.

The voltage $u_{18-38}$, illustrated in FIG. 3 in the top graph $a$, is sensed by the diodes 30 and 33, and is available at the diode junction 38. To permit sensing the voltage $u_{18-38}$ during current flow, diodes are poled to be conductive during such current flow through the respective winding. Potentiometer 36 reduces this voltage to half, so that the tap 37 of the potentiometer provides about half of this voltage. The half-value is illustrated in the second row ($b$) in FIG. 3. The half-voltage is applied to controller 42 over line 43. The voltage representative of the $iR$ drop (graph $c$, FIG. 3) is applied to the controller 42 directly by junction 39. Controller 42 includes a comparator, in which the difference between the voltages at junctions 43 and 39 is derived. The voltage at junction 38, before being applied to the controller 42 is weighted, or normalized with respect to the voltage at junction 39. This weighting or normalization is effected in the potentiometer 37. By changing the position of the tap or slider 37, the voltage at line 43, or the voltage at line 39, can be made to predominate.

FIG. 3, graph $d$ (lowest graph) illustrates the change obtained by changing the position of the tap point or slider 37. If the slider 37 is shifted slightly upwardly, that is, if the weighting or reduction ratio is greater than 2 : 1, the halfwaves shown in graph $d$ will have a slight end depression 48 formed therein. As the armature current increases, the extent of depression will increase, so that the d-c portion of the output voltage 47 will become less, which simulates to the controller a lower actual value, when motor current increases.

If the reduction ratio is selected to be less than 2 : 1, that is, changing the slider position slightly downwardly, a bump will form in the graph $d$ of FIG. 3, as shown in dashed lines 49 (with respect to the first halfwave only). This results in negative feedback, since the d-c component of the voltage 47 is increased. The potentiometer 36 can be set exactly in center, and then there will be neither bump nor dip at the peak point of the half-wave; since the armature current is measured directly on the armature windings, this setting will be valid for all operating conditions of the motor.

Controller 43 so controls the current through Hall generator 23, in dependence on voltages applied to controller 42, that the speed of the motor will be held constant. If the motor should increase speed, current in line 44 is reduced. If the speed would become too low, the current is increased so that transistors 32, 35, respectively, will conduct current for longer periods of time, thus increasing motor speed. The exact controller action will be described in detail in connection with FIG. 5.

Figure 4:
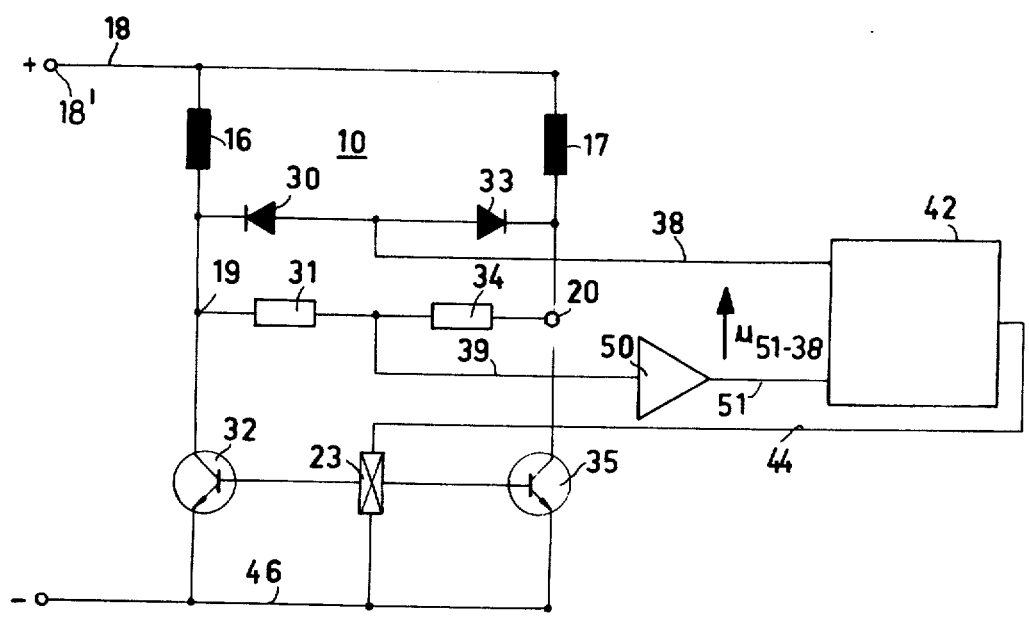
FIG. 4 is another embodiment of the basic circuit of FIG. 1, for use with the motor of FIG. 2.

The weighting of the control voltages derived from the resistors 31, 34 and the diodes 30, 33, respectively, with respect to each other, depends on the number of resistors which are connected to the common junction and, hence, to the number of windings to which the resistors are connected. Thus, for a two-winding motor as illustrated in FIGS. 1 and 2, that is, having a number $n$ of windings $n=2$, the weighting factor is 2. In the example of FIG. 1, the voltages derived from the diodes 30, 33 are reduced by one half. FIG. 4 illustrates an embodiment in which, rather, the voltages derived from the resistors 31, 34 are amplified.

In the circuits to follow, similar parts have been given the same reference numerals and will not be described again.

The circuit of FIG. 4 is effectively identical to the circuit of FIG. 1, and only those parts which are not identical will be described.

In the circuit of FIG. 1, the two voltages are weighted by use of potentiometer 36. In FIG. 4, an amplifier 50 is provided which has an amplification factor of two, that is, it amplifies by the number $n$ of the windings used, that is, $n=2$. The controller 42 will now have voltages applied at its input which are twice that of the voltages applied to the input of the controller 42 of FIG. 1. This has advantages particularly with motors which operate at very slow speed, since the induced voltages in slow-speed motors have low values.

Amplifier 50 is connected to amplify the voltage from junction 39, that is, the signal which is proportional to the $iR$ drop due to armature current. This signal is amplified to the approximate true value of this voltage drop, and thus the true value of the voltage at line 38 can be utilized and directly applied to the other input of the controller 42.

Operation: One input of the controller obtains the voltage shown in line $a$ of FIG. 3. The other input to the controller has a voltage applied thereat which is twice that of the voltage shown in line $c$ of FIG. 3. The voltage, upon subtraction (formation of the difference) in the controller 42, therefore, will have the shape of the voltage shown in FIG. 3, lined, but with twice the amplitude.

Positive feedback in the system is obtained when the amplifier 50 has an amplification which is greater than two; negative feedback if the amplification is less than two. The same wave shape as shown in graph $d$ of FIG. 3 will result, that is, dips 48 or peaks 49 will form in the wave forms applied to the controller itself upon formation of the difference between the signals shown in graphs $a$ and $c$ of FIG. 3.

Figure 5:
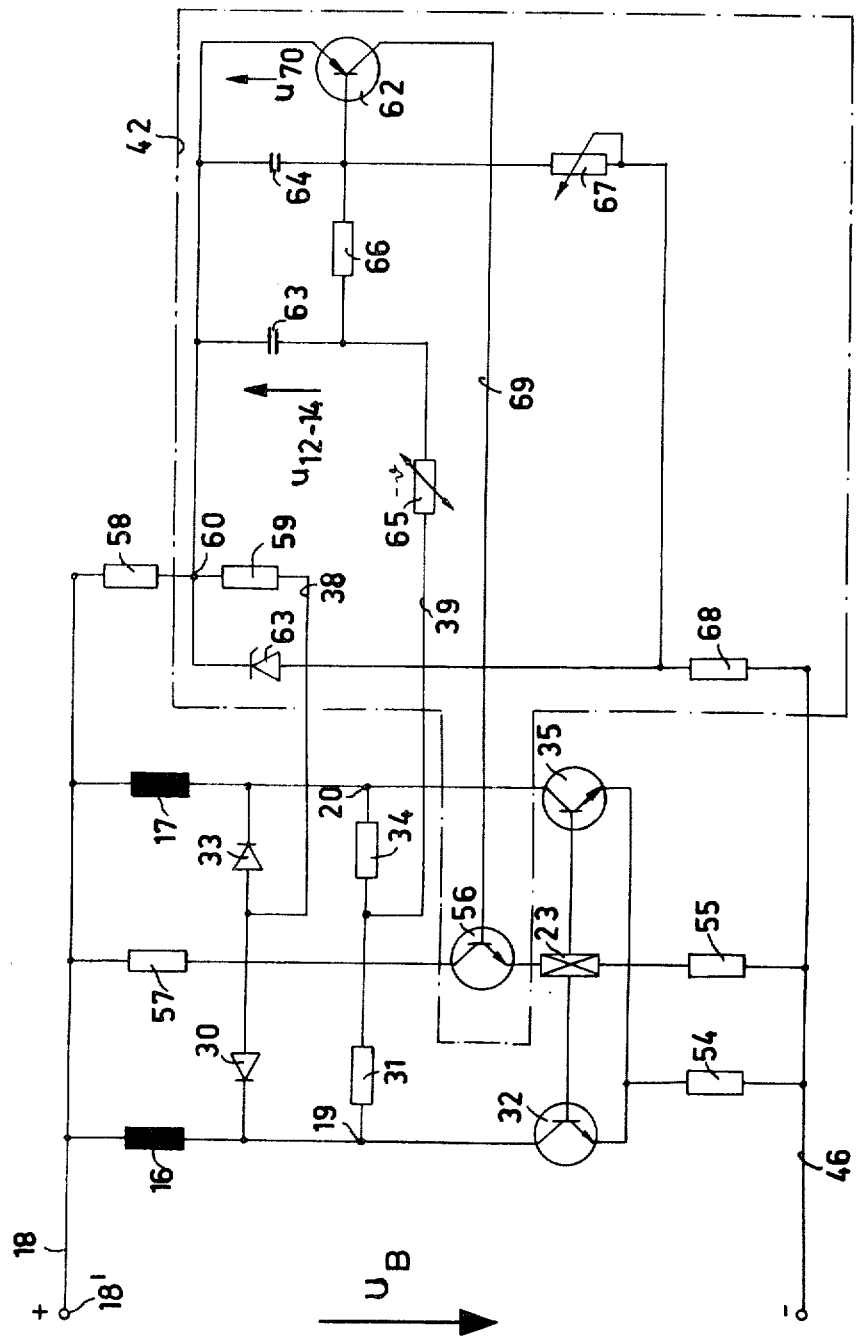
FIG. 5 is a detailed schematic circuit diagram of the circuit of FIG. 1.

Referring now to FIG. 5, where the detailed circuit of the control system of FIG. 1, to operate a motor for example as shown in FIG. 2, is illustrated:

Transistors 32, 35 have their emitters connected by an emitter resistor 54 to negative supply bus 46. The control outputs of Hall generator 23 are connected to the bases of the emitters 32, 35. One of the line terminals of Hall generator 23 is connected through resistor 55 to bus 46, the other line terminal is connected to the emitter-collector path of an npn transistor 56, the collector of which is connected over a resistor 57 to positive bus 18'. Transistor 56 thus acts as a variable resistor in the Hall generator supply line.

Two series connected fixed resistors 58, 59 are used instead of the potentiometer 36. Resistor 58 may have, for example, 740 Ohms, and resistor 59, 750 Ohms. The junction point 60 of the resistors is connected to the cathode of Zener diode 63, forming a constant voltage source. Further. the junction point 60 is connected to the emitter of a pnp transistor 62 and to one terminal, each, of two capacitors 63, 64, each of which may have, for example 2 uF. Junction 39 is connected over a cold conductor (PTC) resistor 65 to the other electrode of the capacitor 63 and, over a resistor 66 (for example 15 k $\Omega$) with the other electrode of capacitor 64 and to the base of transistor 62. The base of the transistor 62 is further connected over a resistor 67, which determines the controlled speed setting for the motor, to the anode of Zener diode 63 and further over a resistor 68 (for example 68 k $\Omega$) to negative bus 46. The collector of transistor 62 is connected with its line 69 to the base of the transistor 56, in circuit with Hall generator 23.

The command value for speed of the motor is formed by means of the circuit comprising Zener diode 63, the voltage divider chain 67, 66, 65 and 31 and 34, respectively. The resistor 65 in this circuit is temperature-dependent, in order to compensate for temperature dependence of induction derived from the permanent magnet rotor 11 (FIG. 2) of the motor.

Figure 6:
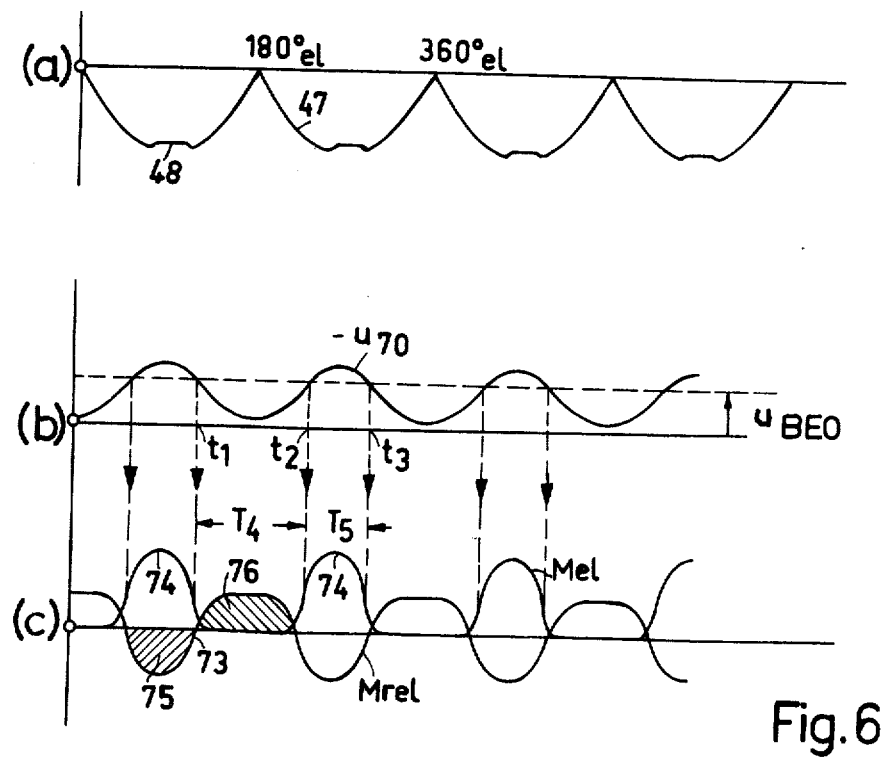
FIG. 6 is a series of graphs illustrating signals and torque relationships arising in motors and the control system of FIG. 5.

Capacitors 63, 64 and resistors 31, 34, respectively, and 65, 66, form a phase-shifting filter which decreases the waviness of the voltage 47, applied to the control system as the voltage representing actual speed — see graph $d$ of FIG. 3, and graph $a$ of FIG. 6. Further, the phase of the voltage 47 (FIGS. 3, 6) is changed by about 180° (for a detailed discussion see U.S. patent application Ser. No. 408,781, filed Oct. 23, 1973, assigned to the assignee of the present application). Smoothing and phase-shifting the voltage $u_{70}$ with respect to the voltage 47 is illustrated in FIG. 6, graph $b$. This is done in order to connect the transistors 32, 35 only during those time periods when the windings 16, 17 have approximately the maximum voltage E induced therein due to the rotor 11, that is, when the best efficiency to drive the motor is obtained. The transistors are turned off, or blocked, during those time periods in which the motor supplies energy in the form of a reluctance torque, which energy has been stored previously during energization of the one or the other of the transistors 32, 35. The motor, then, can provide an essentially constant, or even torque, without gaps in supplied output power or drive power over its rotation through a full 360°-electrical.

Operation: The command voltage of the controller 42 is basically determined by the Zener diode 63. The controller command voltage changes its voltage position periodically with respect to the operating voltage between lines 18' and 46 in rhythm with the voltage which is illustrated in graph $b$ of FIG. 3. A mechanical analogy would be a block which is suspended in a frame from above and from below by a spring, and in which the frame is periodically moved upwardly and downwardly.

Assume the motor to be at rest. Upon connection of a supply voltage $u_B$, windings 16, 17 will have practically no voltages induced therein and only the ohmic voltage drop will arise therein. The voltage at junction 60 as well as the voltage at junction 39 will have the identical wave shape, as illustrated in line $c$ of FIG. 3, that is, will have the form $u_{18-39}$. Expressed differently, the input to the controller will not have any voltage applied thereto under these operating conditions. The transistor 62 will have base current applied over resistor 67, is continuously conductive, and thus holds transistor 56 continuously conductive. Commutation is solely commanded by the Hall generator 23, which will provide maximum motor current.

As the commanded speed is approached, and then reached, the voltage drop across resistors 66, 65 and 31, 34, respectively, will increase. As soon as the voltage drop across the resistors 66, 65 and 31, 34, respectively, (due to current through resistor 67) is approximately equal to the d-c component to the input voltage of the controller between junctions 39 and 43 (in the embodiment of FIG. 6 between junctions 39 and 60) Hall generator 23 will no longer function solely as a commutation element, but now has the function of an AND-gate by connecting, on the one hand, the respective transistors 32, 35 in accordance with rotor position and, on the other hand, affecting this connection only for a period of time provided by the data supplied by the controller 42; that is, Hall generator 23 will logically act on information derived from the controller 42 with the information derived from the induction of the rotating rotor 11 (FIG. 2) of motor 10.

When nominal speed is reached, the voltage of junction 60 approaches that of the base voltage of transistor 62 during the negative half-wave of the voltage. Transistor 62, during these maxima, gradually shifts to blocking condition, and then gradually shifts over to conductive condition, as shown in FIG. 6 during time periods $t_1$ and $t_2$. Transistor 62 becomes conductive at time $t_2$ until time $t_3$, then blocks again, and so on, as the cycle is repeated.

If the speed of the motor increases, the time interval shown at $T_4$ (FIG. 6, graph $b$) between the time periods $t_1$ and $t_2$ increases; the time interval $T_5$ between time periods $t_2$ and $t_3$ decreases. If speed drops, the inverse will occur, that is, $T_4$ will decrease. $T_5$, that is, the time during which current is commanded to flow through transistor 56 and hence, by Hall generator 23, through the one or the other transistor 32, will increase.

The angle of current flow, thus, decreases or increases to hold motor speed constant. Current will flow always at the proper time, namely when, approximately, voltage 47 will have a maximum (compare FIG. 6, graph $a$). The reluctance torque 73 generated in the motor 10 is so selected, by choice of the angles $\alpha$, $\beta$ and $\gamma$, and the dimensions of the air gap, that the gaps in torque between the electrical torque portions (FIG. 6) are filled. The motor can readily be so designed that the drive torque applied thereby is practically constant, even, and without any torque gaps. Such a motor is self-starting with full torque, can drive a load without nonuniform torque-speed characteristics to supply a load with that torque for which it is designed. Such a motor is excellently suited to drive fans, ventilators, blowers, phonographs and record changers, magnetic tape recording equipment of various types, and the like. The commutation of current between windings 16 and 17 is controlled, in operation, by the transistors 56 and 62. The filters 63, 64; 31, 34; 65, 66 can be so designed that the transistors 32, 35 are controlled to switch gradually, that is, transistors 32, 35 change between blocked and conductive condition gradually. This is particularly desirable when audio equipment is being driven, and especially phonographs and record changers, since thereby rumble and wow are avoided.

FIG. 6, graph c, illustrates torque relationships of the motor, driving a load. The cross-hatched area 75 illustrates that portion of the torque in which magnetic drive energy is stored in the motor; the cross-hatched area 76 shows that portion in which the torque is released, and becomes effective in the gaps between the electrical drive torque 74. The areas 75, 76 are equal (neglecting losses).

Figure 7:
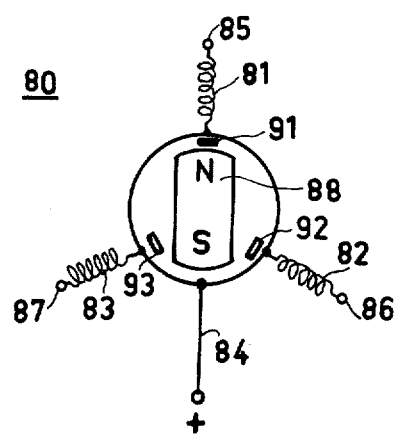
FIG. 7 is a highly schematic transverse diagram of a three-phase brushless d-c motor, having three armature windings.
Figure 8:
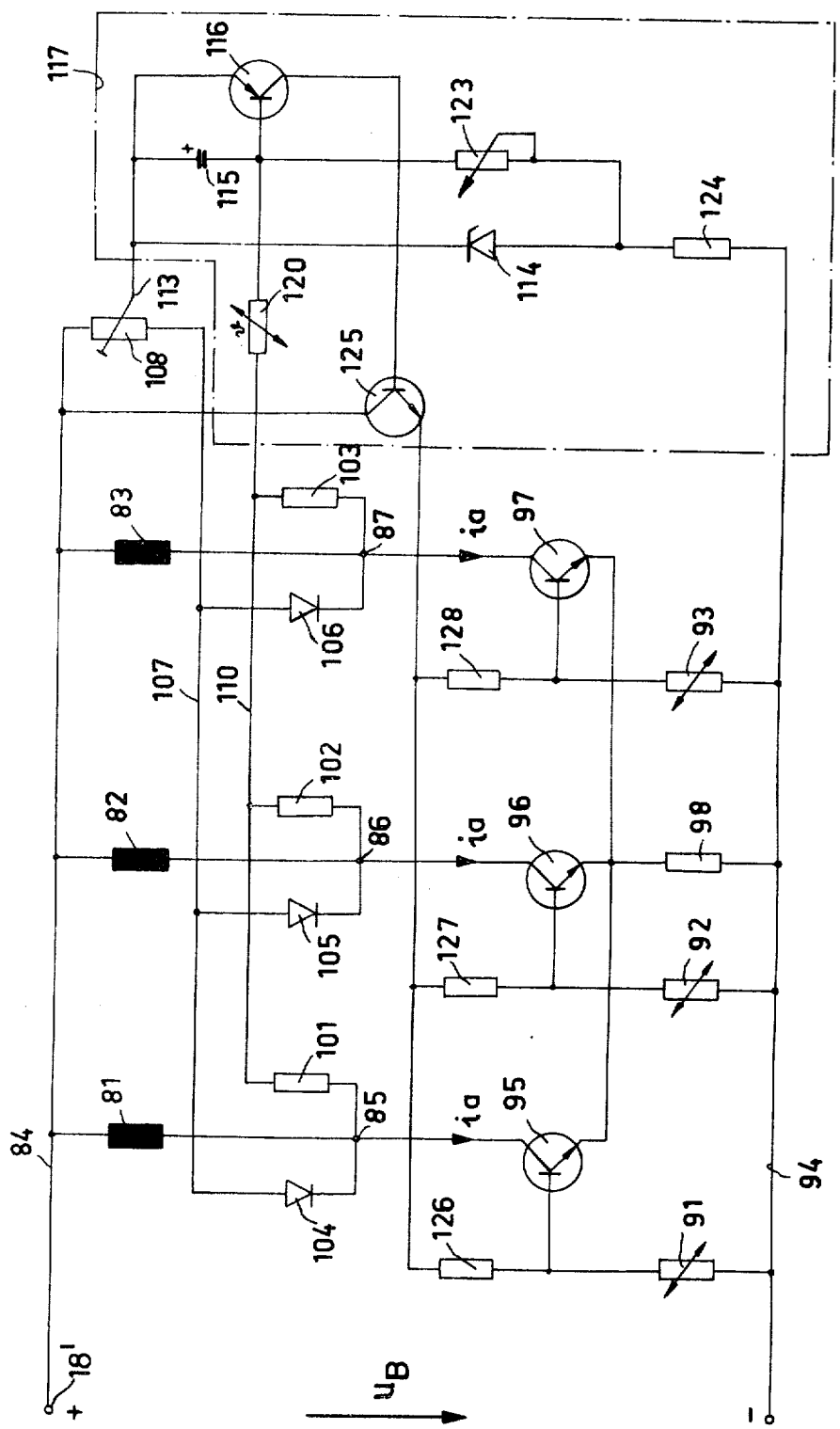
FIG. 8 is a detailed circuit diagram of a control system for the motor of FIG. 7.

FIG. 7 illustrates a brushless d-c motor having three windings, to be used with a control circuit of FIG. 8. The windings 81, 82, 83 are 120° offset electrically, and star-connected. The star connection is shown at 84, connected to a positive source indicated by the + terminal. The free terminals of windings 81, 82, 83 are shown at 85, 86, 87. The rotor 88 has two poles, is permanently magnetic, and three field plates 91, 92, 93 are provided to control commutation. Field plates 91, 92, 93 are magnetically affected resistors which, under the influence of a magnetic field, change their resistance value to become a high resistance.

The control circuit for the motor, schematically shown in FIG. 7, is best seen in FIG. 8. The field plates 91 to 93 are connected to negative bus 94 with one terminal, and with the other terminal to the base of an associated npn transistor 95, 96, 97, respectively. The emitters of the transistors 95, 96, 97 are connected together and through a resistor 98 to negative bus 94. The collectors of transistors 95 to 97 are connected to the terminals 85, 86, 87 of the respective coils 81, 82, 83. Terminals 85, 86, 87 are also, each, connected to the cathodes of diodes 104, 105, 106, and to one terminal of a resistor 101, 102, 103, respectively. The anodes of diodes 104, 105, 106 are connected together to a common junction or line 107; the other terminals of the resistors 101, 102, 103 are connected together to a junction, or line 110. Junction 107 is connected through a potentiometer 108 which is also connected to positive + plus terminal and to the common star connection 84 of the windings.

Junction or line 110 forms a phantom, or artificial null. If rotor 88 (FIG. 7) is artificially driven, junction 110 has the same voltage as that of the star connection 84 which is the real zero or center or null conductor of the three-phase system 81, 82, 83. In actual operation, conductor or junction 110 will have a voltage applied with respect to the star connection 84 which is equal to one third of the voltage $i_a \cdot R_a$, that is, is equal to one-third of the ohmic voltage drop of the respective winding 81, 82 or 83 which, at the time, carries current. Thus, the voltage between junction 107 and star connection 84 must likewise be normalized with respect to the voltage at junction 110, by reduction by one-third, in order to compensate for the number of windings, $n$ =3 (corresponding to the phases in this instant) so that the two voltages can be compared with the same scale. This reduction of the voltage across the windings, or amplification of the voltages across the resistors (FIG. 4) is referred to as weighting, or normalization. Of course, the voltage at junction 110 could be amplified by a factor of $n=3$, similarly to the circuit shown in FIG. 4. Potentiometer 108 is shown in FIG. 8, to reduce the winding voltage. Potentiometer 108 has an upper resistance of, for example 400 Ohms, and a lower resistance of about 810 Ohms, between which resistance values slider 113 can be changed, in order to permit negative, or positive feedback, respectively.

The slider 113 of potentiometer 108 is connected to the cathode of Zener diode 114, and to one terminal of a capacitor 115 as well as to the emitter of transistor 116. Elements 114, 115, 116 form the controller 117. Junction 110 is connected over a cold conductive resistor 120 with the other electrode of capacitor 115 and to the base of transistor 116, and to a resistor 123 which determines the command speed of the system which, in turn, is connected to the anode of Zener diode 114 and through a resistor 124 to negative bus 94. Variable temperature resistor 120 has the same function as resistor 65 in FIG. 5, that is, it compensates for temperature dependence of induced voltages.

The collector of transistor 116 is connected to the base of npn transistor 125, the collector of which is connected to the star terminal 84 and hence to the positive bus 18'. The emitter of transistor 125 is connected over a resistor 126, 127, 128, each, with the base of a respective transistor 95, 96, 97, to which also the magnetic plates or magnetic resistors 91–93, respectively, are connected.

Operation: Controller 117 operates practically identically to that of controller 42 (FIG. 5), so that the detailed operation need not be described again. It is not necessary to phase-shift the voltage applied as an actual operation voltage to the controller in the embodiment of FIG. 8, since at any instant of time (that is, in any one rotor position) one of the transistors 95, 96, 97 can be conductive. A slight phase-shift of, for example, 60° which may be effected by the capacitor 115, is highly desirable to improve the efficiency of operation. Depending on the value of the voltage effective between emitter and base of transistor 116, transistor 116 will be conductive or will block. The transistor 116, upon start of the motor, will be held to be conductive over resistor 123. Control of the speed will be obtained when the resistor pairs 126–91; 127–92; 128–93 will have more or less current applied thereto so that the transistor, whose field resistor 91, 92, 93, at any instant, is in the high-resistance condition, will have more or less high base current applied. Since the motor is driven only by electromagnetically derived torques, transistor 116 may be controlled by a d-c voltage, commutation of current being effected by the magnetic resistors, or field plates 91–93, and the common resistor 98.

The tap point 113 must be shifted upwardly to obtain positive feedback, that is, towards junction 84. To obtain negative feedback, the tap point 113 of potentiometer 108 is shifted downwardly. This arrangement is particularly suitable to obtain data for proper dimensioning of the components of the controller during design, for example when setting up a "breadboard" in the laboratory; after suitable resistance values have been determined, the potentiometers 108, 113 can be replaced by fixed resistors with predetermined voltage division ratio.

The number of windings with which the motor is supplied can be suitably selected, depending on motor design. The motor will, for example, have four, five, six and more armature windings. In all cases, the armature winding current is precisely and directly sensed at the associated winding. Motor and controller are so matched to each other that only the armature winding which is used to control the speed of the motor has current flowing therethrough at any one time — that is, only one of the windings has current flowing therethrough to obtain proper control. In motors with more than three windings, it may be sufficient to sense voltages at only a portion of the windings in order to effect proper control. Experiments have shown that a motor with four windings, as shown for example in the initially referred-to "Siemens Journal" literature, it suffices to sense the voltage at two windings, while still obtaining excellent and suitable speed control. The present invention is particularly suitable with single phase motors of the type shown in FIGS. 1, 2, 4 and 5, and of the type referred to in cross-reference applications Ser. No. 363,290 and 363,291, both filed May 23, 1973, now U.S. Pat. Nos. 3,840,761 and 3,873,897 assigned to the assignee of the present application. As described in connection with FIGS. 5 and 6, the waviness of the phase-shifted voltage $u_{70}$ controls motor current so that the motor current, and thus the electromagnetic torque 74 (FIG. 6) is effective only during those angular positions of the motor in which substantial and efficient coupling between the rotor 11 (FIG. 2) and the stator windings 16, 17 (FIG. 2) occurs.

Figure 9:
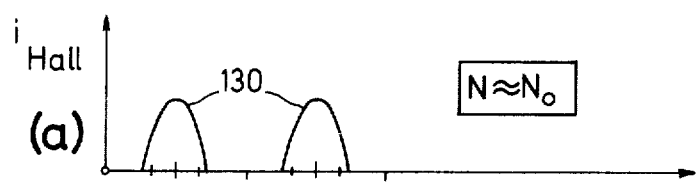
FIG. 9 illustrates signals arising in the circuit of FIG. 8.
Figure 9:
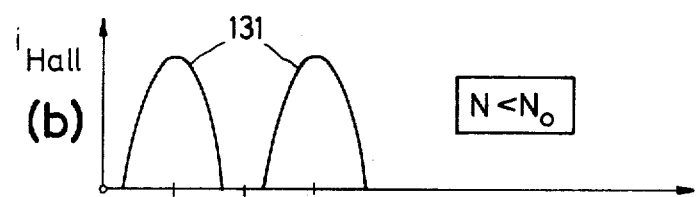

The output signal of the controller, that is, the current through Hall generator 23 (FIG. 5) has a current-time area which increases approximately quadratically with the input signal. Referring to FIG. 9: Hall current 130, 131 is illustrated for different input signals, of different amplitude. Hall current 130 (FIG. 9, graph a) illustrates the condition in which a small input signal is present, that is, a signal in which the speed N of the motor corresponds approximately to the command speed $N_o$. In graph b, the Hall current 131 is shown corresponding to a greater input signal, that is, in which the actual motor speed $N$ is less than commanded motor speed $N_o$. The Hall current increases, and the time during which the Hall current flow also increases, thus leading to the exponential relationship between energy applied to the Hall generator and speed.

Figure 10:
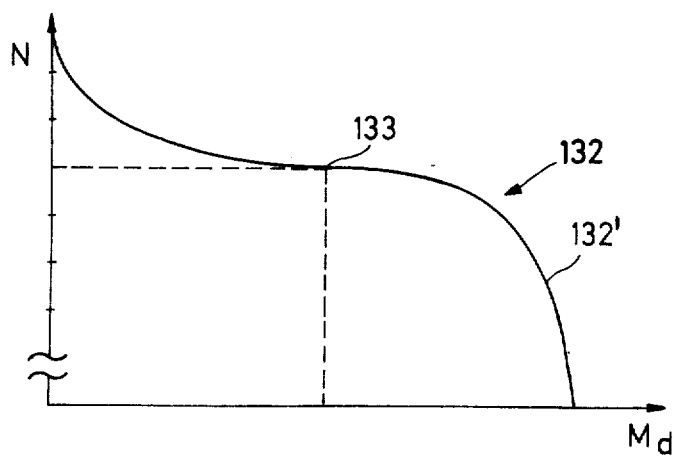
FIG. 10 shows a speed-torque characteristic upon increasing of loading of a motor connected in the circuit of FIG. 8.

The exponential change of the time-current area, typically quadratic, has as a result that the speed-torque characteristic 132, shown in FIG. 10, initially flattens out as the load increases. In other words, the controller, at first, opposes a drop in speed only little, but then much more since, upon increasing torque, the loop amplification in the control loop increases due to the above-described quadratic relationship. At very high torques, the internal resistance of windings 16, 17 limits the motor current so that the speed drops rapidly, as shown in FIG. 10 at the curved portion 132'. The overall speed-torque curve 132 is approximately S-shaped.

It is desirable to limit the overall loop amplification in the control loop to a certain maximum for stability of the loop. As a result, the amplification of transistors 62 and 56 (FIG. 5) or 116, 125 (FIG. 8) cannot be increased over a limiting value, in order to still maintain stability of operation of the controller. This would be undesirable for many applications, for example for phonograph or record changer drives, since the required torque, in operation, is low. The operating point of the motor which is required would not coincide with the flattest portion 133 of the curve, indicated by the dotted line in FIG. 10. For stable operation, the operating point of the motor, at the desired speed, should preferably be at a point of the overall operation curve which is flat.

Figure 11:
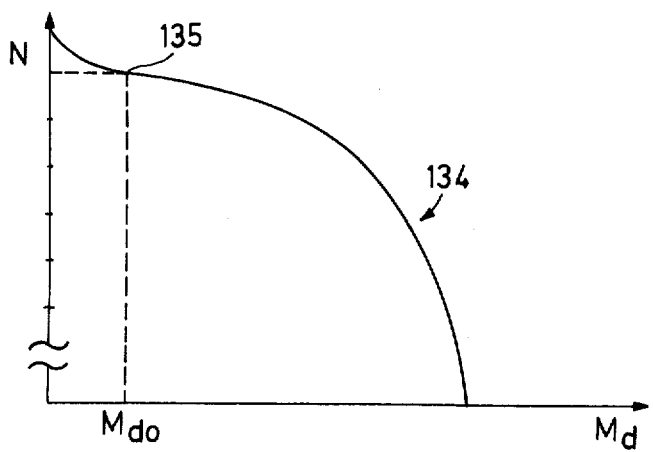
FIG. 11 illustrates a speed-torque curve which can be obtained for a motor connected in the circuit of FIG. 8, upon change of circuit parameters and change of feedback relationships in the circuit of FIG. 8.

The present invention permits adjustment of the operating characteristics of the motor so that the flat point of the operating curve can be placed, selectively, at suitable torque positions. FIG. 11 illustrates curve 134 suitable, for example, for a turntable or record changer, in which the flattest point 135 of curve 134 coincides with the torque $M_{do}$ required for a turntable. This characteristic is obtained by suitable, mutual setting of the parameters in the control loop, in two respects:

1. The current-dependent feedback is set to be a negative feedback, by adjustment of the relative proportion of resistors 58, 59 (or of the resistors 36, 37, FIG. 1; or of the amplification factor of the amplifier 50, FIG. 4) to be relatively high;

2. the loop amplification in the control loop is selected to be relatively high by suitable dimensioning of the components therein.

Together, the flat point 135 in the operating characteristic 134 is shifted in the direction of low motor torque. High loop amplification becomes rapidly effective whereas upon higher motor loading, the quadratic, or exponential change of the current-time area (see FIG. 9) is over-compensated by the current-dependent negative feedback, so that instabilities are avoided (which might otherwise result due to the high loop amplification). The change in slope at point 135 of the S-shaped curve 134 can, therefore, be selectively adjusted, as desired, to the operating torque for which the motor is to be designed. Of course, if the change in slope, that is, the flat point (slope zero) is to be shifted to a higher operating torque, then loop amplification is reduced and negative feedback is likewise reduced.

Various changes and modifications may be made within the scope of the inventive concept.

The change in the normalization or weighting ratio from precisely the factor $n$, corresponding to the number of windings, to the actual ratio used, to thereby introduce positive, or negative feedback (depending on the direction of change) is small; a variation in resistance, for example, of potentiometer 36 (FIG. 1) from the exact center position of 5 to 10 percent in either direction has been found to introduce sufficient feedback to obtain all desired speed-torque characteristics (FIGS. 10, 11), without introducing instability or detracting from proper operation of the controller 42. Likewise, a change in the amplification factor of amplifier 50 (FIG. 4) of 5 to 10 percent beyond the factor $n$ is suitable.

When reference is made to "multiplying" by a factor which includes $n$, direct multiplication or multiplication by the reciprocal of $n$ is deemed equally included.

A typical resistance ratio for a controller for a turntable as shown in FIG. 5 would be 560 ohms for resistor 58 and 510 ohms for resistor 59, resulting in a reduction ratio of 1.92 ÷ 1 (i.e., 1070 ÷ 560) and a corresponding negative feedback. Such a ratio is called an 8 percent variation in resistance. Typically, such a ratio would reduce the torque at flat point 135 to about one fifth of the starting torque; if the reduction ratio is exactly 2 : 1, the flat point torque typically would be about 50 percent of the starting torque.

I claim:

1. A speed control circuit for a constant field d-c motor having armature windings ( 16, 17; 81, 82, 83),
   controlled switch means (32, 35; 95, 96, 97) connected in series with the armature windings and a source of power ( 18'; +, − ) to control energization of the armature windings,
   a controller (42-56; 117-125) providing control signals to the controlled switch means to effect such energization, and a diode (30, 33; 104, 105, 106), each, having first like respective terminals connected to a respective winding and second like terminals connected together at a common diode junction (38); characterized in that the diodes are poled to be conductive during current flow from the source through respective switch means to the respective windings to derive, across the respective $n$ windings, a first control voltage ($u_{18-38}$) which is representative of a composite of the emf ($E$) induced by the field of the rotor in the respective windings, and the resistance voltage drop ($i_a \cdot R_a$) due to current flow through the respective $n$ armature windings;

a resistor (31, 34; 101, 102, 103), each, is provided having first respective terminals connected to a respective winding of said $n$ windings and second terminals connected together to a common resistor junction (39) to derive, across the respective winding, a second control voltage ($u_{18-39}$) which is representative of $1/n$ of the resistance voltage drop ($i_a \cdot R_a$) due to current flow through the $n$ armature windings;

means (36, 37; 50; 58, 60; 113) weighting and normalizing said first and second control voltages with respect to each other by the factor of $n$;

and means (42; 62, 116) comparing said first and second normalized, weighted control voltages and forming a difference control signal ($u_{39-43}$; $u_{51-38}$), the controller (42–56; 117–125) controlling energization of the controlled switch means (32, 35; 95, 96, 97) under command of said difference control signal.

2. Circuit according to claim 1, wherein the normalization means comprises means multiplying an electrical quantity by a function including the value $n$.

3. Circuit according to claim 2, wherein, to introduce armature current feedback to the controller (42), the multiplying means multiply by a factor slightly different from $n$, or its reciprocal, $1/n$.

4. Circuit according to claim 1, wherein the normalizing means comprises means reducing the first control voltage ($u_{18-38}$) at the diode junction (38) by a factor of about $1 : n$ before being applied to the comparison means.

5. Circuit according to claim 4, wherein the means reducing the first control voltage comprises a voltage divider (36; 58, 59; 108) connected to the diode junction (38);

and the comparison means has applied thereto a voltage derived from the resistor junction (39) and the voltage derived from the voltage divider connected to the diode junction (38).

6. Circuit according to claim 5, wherein the voltage divider connected to the diode junction (38) has a voltage division ratio which is somewhat greater than $n : 1$ to introduce positive feedback, representative of armature current ($i_a$) flow to the controller.

7. Circuit according to claim 5, wherein the voltage divider connected to the diode junction (38) has a voltage division ratio which is less than $n : 1$ to introduce negative feedback representative of armature current ($i_a$) to the controller.

8. Circuit according to claim 1, wherein the normalizing means comprises means (50) amplifying the second control voltage ($u_{18-39}$) by a factor of about $n$ before being applied to the comparison means.

9. Circuit according to claim 8, wherein the amplifying means has an amplification factor somewhat greater than $n$ to introduce positive feedback, representative of armatue current ($i_a$) flow to the controller (42).

10. Circuit according to claim 8, wherein the amplifying means (50) has an amplification factor somewhat smaller than $n$ to introduce negative feedback representative of armature current ($i_a$) flow to the controller (42).

11. Circuit according to claim 1, wherein the controller (42) includes a constant voltage element (63; 114);

the difference control signal varying simultaneously, with respect to d-c supply, due to the emf component of the first control signal, said difference control signal being applied to a terminal of the constant voltage element to provide a constant comparison voltage to the controller varying with respect to d-c supply cyclically and in synchronism with the emf induced in the motor windings.

12. Circuit according to claim 11, wherein the motor (10) has two armature windings (16, 17) alternately supplied with current, and includes means generating a reluctance torque;

and wherein the controller (42) comprises a phase shifter (31, 34, 63, 64, 65, 66) to provide signals commanding current flow through the windings of the motor at positions of the rotor of the motor with respect to the windings which are an optimum to generate driving torque in the motor.

13. Circuit according to claim 11, wherein the motor is a permanent rotor motor and wherein the controller (42) includes a temperature-dependent element (65, 120) to compensate for temperature dependence of induction due to the permanent magnet rotor.

14. Circuit according to claim 11, wherein the motor has a commutating element (23) sensing angular rotor position, said commutating element being connected to the output of the controller (42) and to energize the motor windings in accordance with sensed position of the rotor and the output of the controller (42).

15. Circuit according to claim 14, wherein the commutating element is a Hall generator (23), the control current to said Hall generator being supplied by the output of the controller (42), whereby the Hall generator will operate as an AND-gate and provide energization to the respective motor winding when a. the magnetic field to which the Hall generator is exposed, due to presence of the rotor, has a proper polarity for conduction of the Hall generator, and b. the controller (42) provides an output signal to the Hall generator, said output signal being connected to the controlled switch means (32, 35) by the Hall generator.

16. Circuit according to claim 3, wherein the controller (42) comprises an amplifying means;

wherein the sign and extent of feedback obtainable by changing the factor to differ from $n$ and the amplification factor of the amplifying means in the controller are independently adjustable and selectable to obtain, selectively and controllably, different speed-torque characteristics of the motor.

17. Circuit according to claim 3, wherein the controller (42) comprises an amplifying means;

wherein the sign and extent of feedback obtainable by changing the factor to differ from $n$ and the amplification factor of the amplifying means in the controller are adapted to provide negative feedback dependent on armature current ($i_a$) and high amplification to thereby obtain a speed-torque characteristic (134) which is flat at low torques (FIG. 11).

18. Circuit according to claim 17, in combination with a permanent magnet motor (10) having two armature windings (16, 17) alternately supplied with current pulses by, and under command of said controlled switch means (32, 35), and having means generating a reluctance torque which is effective during gaps in the current flow through the armature winding.

* * * * *